(12) United States Patent
Ma et al.

(10) Patent No.: US 11,216,340 B2
(45) Date of Patent: Jan. 4, 2022

(54) ADAPTIVE CHANGE OF REDUNDANCY LEVEL OF RAID

(71) Applicant: EMC IP Holding Company LLC, Hopkinton, MA (US)

(72) Inventors: Chun Ma, Beijing (CN); Lifeng Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/824,016

(22) Filed: Mar. 19, 2020

(65) Prior Publication Data
US 2020/0349004 A1 Nov. 5, 2020

(30) Foreign Application Priority Data
Apr. 30, 2019 (CN) .......................... 201910360753.6

(51) Int. Cl.
 *G06F 11/10* (2006.01)
 *G06F 3/06* (2006.01)
(52) U.S. Cl.
 CPC ........ *G06F 11/1076* (2013.01); *G06F 3/0619* (2013.01); *G06F 3/0659* (2013.01); *G06F 3/0689* (2013.01)

(58) Field of Classification Search
CPC .. G06F 3/0689; G06F 3/0619; G06F 11/1096; G06F 11/1076; G06F 3/0659
See application file for complete search history.

(56) References Cited

U.S. PATENT DOCUMENTS

| | | | | |
|---|---|---|---|---|
| 10,613,770 B2 * | 4/2020 | Gao | ...................... | G06F 3/0665 |
| 10,929,065 B2 * | 2/2021 | Gao | ...................... | G06F 3/0634 |
| 10,936,419 B2 * | 3/2021 | Xu | ....................... | G06F 11/2094 |
| 2015/0286531 A1 * | 10/2015 | Bondurant | .......... | G06F 11/1088 714/6.23 |
| 2016/0217039 A1 * | 7/2016 | Reinart | ............... | H03M 13/373 |
| 2018/0336098 A1 * | 11/2018 | Gladwin | ................ | G06F 3/067 |

\* cited by examiner

*Primary Examiner* — Guy J Lamarre
(74) *Attorney, Agent, or Firm* — BainwoodHuang

(57) ABSTRACT

Techniques for storage management involve: detecting a trigger for an adjustment of a redundant level for a set of RAIDs. Each of the set of RAIDs includes one or more RAID extents. Each RAID extent is formed by a plurality of storage extents from a set of storage extents. The set of storage extents is obtained by dividing a plurality of storage disks into storage extents. The plurality of storage extents are located in different storage disks of the plurality of storage disks. The techniques further involve: in response to detecting the trigger, selecting, from the set of RAIDs, a target RAID for which the redundant level is to be adjusted. The techniques further involve: adjusting the redundant level of the target RAID from a first redundant level to a second redundant level. Such techniques can improve the performance of a RAID storage system.

23 Claims, 4 Drawing Sheets

ADAPTIVE CHANGE OF REDUNDANCY LEVEL OF RAID

CROSS REFERENCE TO RELATED APPLICATION

This application claims priority to Chinese Patent Application No. CN201910360753.6, on file at the China National Intellectual Property Administration (CNIPA), having a filing date of Apr. 30, 2019, and having "ADAPTIVE CHANGE OF REDUNDANCY LEVEL OF RAID" as a title, the contents and teachings of which are herein incorporated by reference in their entirety.

FIELD

Embodiments of the present disclosure generally relate to computer systems or storage systems, and more specifically, to a method for storage management, an electronic device and a computer program product.

BACKGROUND

In current storage systems, storage disks can be organized into a storage extent pool for managing the capacity of the storage disks. In the storage extent pool, each storage disk is divided into storage extents of a same size. In general, the size of a storage extent may be several gigabyte (GB) or tens of GBs. The mapped redundant arrays of independent disks (mapped RAID) is a subclass of RAID group, which implements a RAID algorithm based on storage extents instead of storage disks. The RAID algorithm used in the mapped RAID may be the same as that in a traditional RAID. Hereinafter, the mapped RAID may also be simply referred to as a RAID in the event that no confusion occurs.

However, storage systems based on RAIDs consisting of storage extents still have various shortcomings and deficiencies, and cannot meet the performance requirements of storage systems in many scenarios, thereby resulting in a poor user experience.

SUMMARY

Embodiments of the present disclosure relate to a method for storage management, an electronic device and a computer program product.

In a first aspect of the present disclosure, there is provided a method for storage management. The method includes: detecting a trigger for an adjustment of a redundant level for a set of RAIDs. Each of the set of RAIDs includes one or more RAID extents. Each RAID extent is formed by a plurality of storage extents from a set of storage extents. The set of storage extents is obtained by dividing a plurality of storage disks into storage extents. The plurality of storage extents are located in different storage disks of the plurality of storage disks. The method also includes: in response to detecting the trigger, selecting, from the set of RAIDs, a target RAID for which the redundant level is to be adjusted. The method further includes: adjusting the redundant level of the target RAID from a first redundant level to a second redundant level.

In a second aspect of the present disclosure, there is provided an electronic device. The electronic device includes at least one processor and at least one memory storing computer program instructions. The at least one memory and the computer program instructions are configured, with the at least one processor, to cause the electronic device to: detect a trigger for an adjustment of a redundant level for a set of RAIDs. Each of the set of RAIDs includes one or more RAID extents. Each RAID extent is formed by a plurality of storage extents from a set of storage extents. The set of storage extents is obtained by dividing a plurality of storage disks into storage extents. The plurality of storage extents are located in different storage disks of the plurality of storage disks. The at least one memory and the computer program instructions are also configured to, with the at least one processor, cause the electronic device to: in response to detecting the trigger, select, from the set of RAIDs, a target RAID for which the redundant level is to be adjusted. The at least one memory and the computer program instructions are further configured to, with the at least one processor, cause the electronic device to: adjust the redundant level of the target RAID from a first redundant level to a second redundant level.

In a third aspect of the present disclosure, there is provided a computer program product. The computer program product is tangibly stored on a non-volatile computer-readable medium and including machine-executable instructions. The machine-executable instructions, when being executed, cause a machine to perform steps of the method according to the first aspect.

It is to be appreciated that the contents described in the summary are not intended to define key or essential features of embodiments of the present disclosure, nor intended to limit the scope of the present disclosure. Other features of the present disclosure will be readily understood through the following description.

BRIEF DESCRIPTION OF THE DRAWINGS

Through the following detailed description with reference to the accompanying drawings, the above and other objectives, features, and advantages of embodiments of the present disclosure will become more readily understood. Several embodiments of the present disclosure are illustrated by way of example but not limitation in the drawings in which.

Throughout the drawings, the same or similar reference numerals are used to refer to the same or similar components.

DETAILED DESCRIPTION

Figure 1:
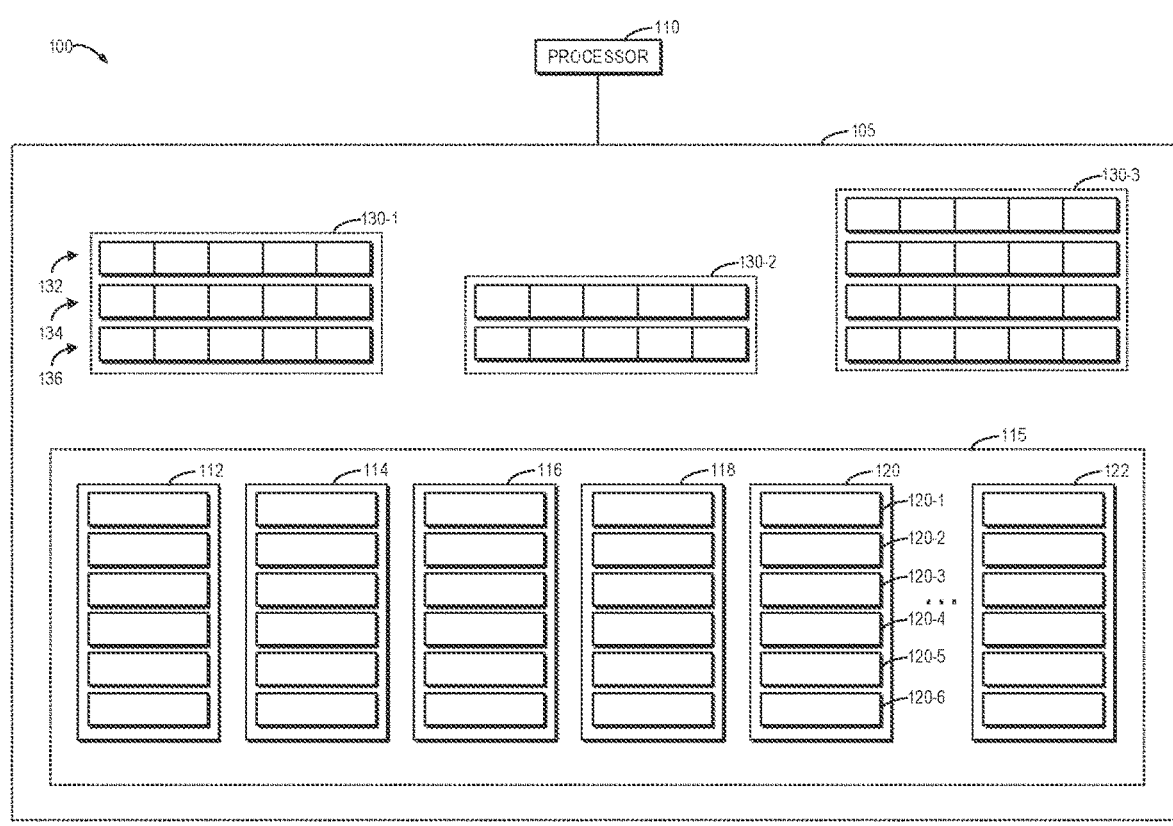
FIG. 1 illustrates a schematic diagram of an example storage system in which embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles and spirit of the present disclosure will be described below with reference to several example embodiments illustrated in the drawings. It should be appreciated that description of those particular embodiments is merely to enable those skilled in the art to better understand and implement the present disclosure and is not intended for limiting the scope of the present disclosure in any manner.

FIG. 1 illustrates a schematic diagram of an example storage system 100 in which embodiments of the present disclosure may be implemented. As shown in FIG. 1, the storage system 100 may include a processor 110 and a storage structure 105. The processor 110 is used for performing operations related to the storage system 100, such as input/output (I/O) operations, control operations, management operations, and so on. More generally, in cooperation with necessary hardware and software, the processor 110 can perform any operations associated with the storage system 100. In addition, the storage structure 105 is used to organize and manage storage resources of the storage system 100, such as various physical storage disks and the like, in an appropriate manner.

As an example organization manner, as shown, storage disks 112 to 122 of the storage system 100 can be divided into storage extents of a same size. Taking the storage disk 120 as an example, it is divided into storage extents 120-1 to 120-6. In the same manner, the storage disks 112 to 118 and the storage disk 122 can also be divided into a plurality of storage extents having the same size as that of the extents 120-1 to 120-6. A set 115 of all these storage extents may also be referred to as a storage extent pool 115. It will be understood that although a particular number of storage disks are shown in FIG. 1, and each storage disk is divided into a particular number of storage extents, this is merely for example and is not intended to limit the scope of the disclosure in any way. In other embodiments, the storage system 100 can include any number of storage disks, and each storage disk can be divided into any number of storage extents.

As mentioned above, RAID algorithms can be implemented based on storage extents. In other words, the resource unit used by a RAID algorithm may be changed from a storage disk in traditional sense to a storage extent, namely, a portion of a storage disk. As an example, FIG. 1 shows a set of RAIDs 130 created on top of the storage extent pool 115, and the set of RAIDs 130 includes three RAIDs 130-1, 130-2, and 130-3, for example. Each RAID includes one or more RAID extents. Taking the RAID 130-1 as an example, it includes three RAID extents 132, 134, and 136. The RAID extent is a stripe consisting of storage extents from the set 115 of storage extents, and the number of storage extents in the RAID extent is the same as the width of the RAID. A plurality of storage extents in each RAID extent are located in different ones of the plurality of storage disks 112 to 122. Similarly, in the example of FIG. 1, the RAID 130-2 includes two RAID extents, and the RAID 130-3 includes four RAID extents.

It will be understood that although FIG. 1 illustrates the set of RAIDs 130 as including a particular number of RAIDs, each RAID as including a particular number of RAID extents, and each RAID extent as including a particular number of storage extents, these particular numbers are only for example and are not intended to limit the scope of the present disclosure in any manner. In other embodiments, a set of RAIDs based on the storage extent pool 115 may include any number of RAIDs, each RAID may include any number of RAID extents, and each RAID extend may include any number of storage extents.

In some embodiments, the storage disks 112 to 122 in the storage system 100 that are organized and managed through the storage structure 105 may include devices of various types with a storage function, including but not limited to, a hard disk (HDD), a solid state Disk (SSD), a removable disk, a compact disk (CD), a laser disk, an optical disk, a digital versatile disk (DVD), a floppy disk, a Blu-ray disk, a serial attached small computer system interface (SCSI) storage disk (SAS), a serial advanced technology attachment (SATA) storage disk, any other magnetic storage device and any other optical storage device, or any combination thereof.

Similarly, the processor 110 of the storage system 100 may include any device that implements a control function, including but not limited to, a special purpose computer, a general purpose computer, a general purpose processor, a microprocessor, a microcontroller, or a state machine. The processor 110 may also be implemented as an individual computing device or a combination of computing devices, for example, a combination of a DSP and a microprocessor, a plurality of microprocessors, one or more microprocessors in conjunction with a DSP core, or any other such configuration.

It should be understood that FIG. 1 only schematically illustrates units, modules or components in the storage system 100 that are related to embodiments of the present disclosure. In practice, the storage system 100 may also include other units, modules, or components with other functions. Thus, embodiments of the present disclosure are not limited to the specific devices, units, modules or components depicted in FIG. 1, but are generally applicable to any storage system based on a RAID technology.

As described above, storage systems based on RAIDs consisting of storage extents still have various shortcomings and deficiencies, and cannot meet performance requirements of storage systems in many scenarios, there by resulting in a poor user experience. For example, a conventional storage system requires that a storage extent pool and RAIDs created on top of the storage extent pool have a same RAID type. That is, if there is a RAID of some type (for example, RAID 5) in a storage extent pool, then all RAIDs created in the storage extent pool are required to be of that type. This means that, when a conventional storage extent pool and a RAID are created, the RAID type is specified and cannot be changed after being created. In addition, there can be only one RAID type in the whole storage extent pool. The current technical state and technical requirements of conventional storage systems may lead to some problems.

First, different user data in a storage system may require different reliabilities. Although for user data it is always better to have a higher reliability, there is also a tradeoff for a storage system to perform among the storage reliability, the performance of the storage system, and the utilization of storage disks. Hence, more important user data may need to be stored with a RAID type having a higher reliability. However, a traditional storage extent pool only supports one RAID type, and thus provides only one level of reliability.

As a result, merely due to the limitation of the RAID type of a storage extent pool, different user data need to be stored into different storage extent pools, which is inconvenient.

Additionally, the reliability requirement of user data may change. Thus, there may be a situation in which user data with a lower reliability requirement is stored using a RAID type of a three-way mirror which has a very high reliability. Although such a RAID type provides a high reliability, it occupies more storage space and therefore the above situation actually wastes the storage capacity of the storage system. On the other hand, user data with a higher reliability requirement may be stored using a RAID type (for example, RAID 0) without any data redundancy, which exposes the user data to a greater risk of loss. Therefore, traditional storage extent pools and RAIDs cannot satisfy various reliability requirements of user data.

Furthermore, when a storage system runs well without any errors, spare storage extents in the storage extent pool will keep free. Actually, a guarantee of a higher reliability can be provided using these spare storage extents, if this is allowed by the system resources (such as, CPUs, memories, storage space) of the storage system. However, due to the above-mentioned limitation of the RAID type in the conventional storage systems, the free system resources of the storage system may always keep free without full usage, which is also a waste.

In view of the above problems and other potential problems in the conventional solutions, embodiments of the present disclosure propose a method for storage management, an electronic device, and a computer program product, so that a redundant level of a RAID can match a reliability requirement of user data. The basic idea of embodiments of the present disclosure is using free storage extents to provide extra data redundancy, by changing a redundant level of a RAID adaptively. In particular, embodiments of the present disclosure may allow a storage system to dynamically raise or reduce a redundant level of a RAID by changing a RAID type, based on the operation state, the utilization of storage space, and other possible factors of the storage system.

Embodiments of the present disclosure provide more flexible protection for user data, which may use different RAID types to store user data with different degrees of importance, without being limited to a strictly fixed RAID type. In other words, embodiments of the present disclosure can support different RAID types in the same storage extent pool, thereby avoiding the need to divide storage disks into different storage extent pools merely because the storage disks are to be configured as different RAID types. Moreover, embodiments of the present disclosure are compatible with conventional storage systems and thereby they are easy to apply. Furthermore, the conversion between RAID types provided by embodiments of the present disclosure will not affect the I/O performance of a storage system. In summary, embodiments of the present disclosure may improve the performance of a RAID storage system. Some example embodiments of the present disclosure are described in detail below with reference to FIGS. 2 and 3.

Figure 2:
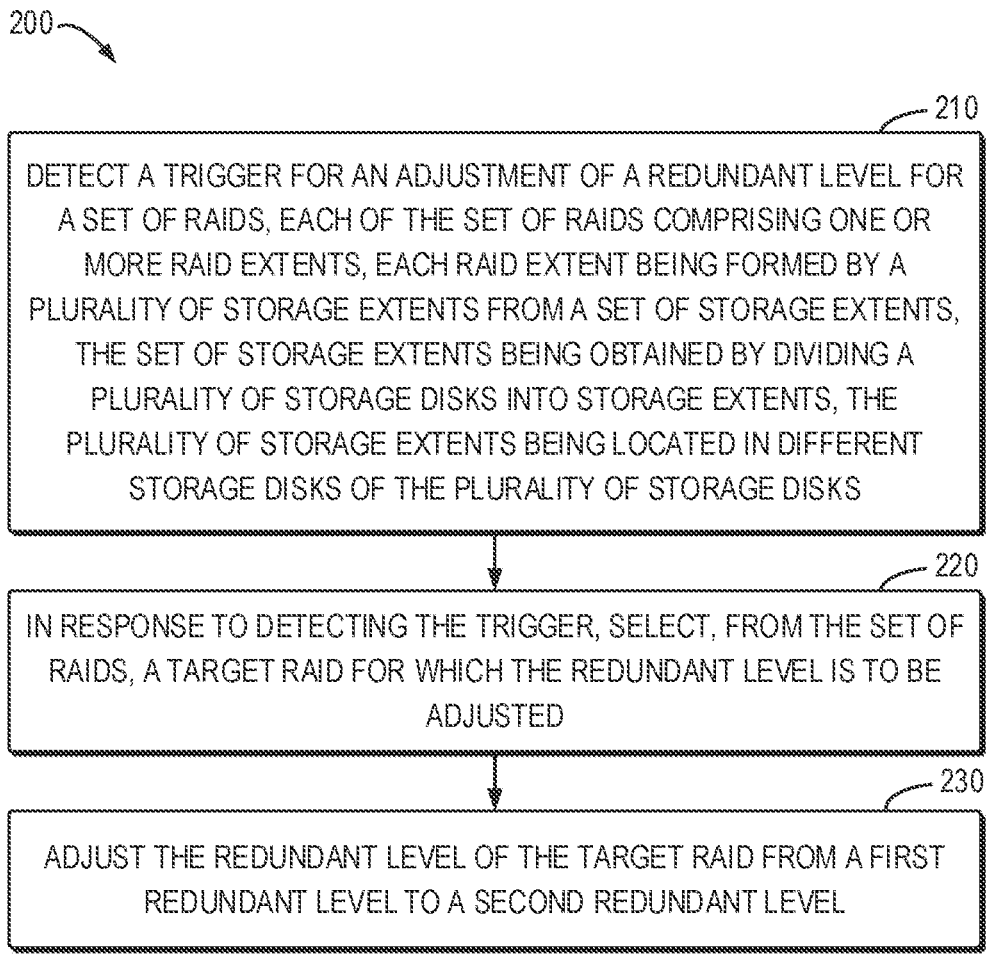
FIG. 2 illustrates a schematic flow chart of a method for storage management in accordance with an embodiment of the present disclosure.

FIG. 2 illustrates a flow chart of a method 200 for storage management in accordance with an embodiment of the present disclosure. In some embodiments, the method 200 can be implemented by the processor 110 or a processing unit of the storage system 100, or may be implemented by various units or modules with processing functions or management functions of the storage system 100. In other embodiments, the method 200 can also be implemented by a computing device independent of the storage system 100, or by other units or modules in the storage system 100. The method 200 will be discussed below in connection with the storage system 100 of FIG. 1.

At 210, the processor 110 detects a trigger for an adjustment of a redundant level of the set of RAIDs 130. That is, the processor 110 detects that the redundant level needs to be adjusted for the set of RAIDs 130 or the storage extent pool 115. For example, the processor 110 may receive, from a user of the set of RAIDs 130, an indication to perform an adjustment of a redundant level. As used herein, the "user" of the set of RAIDs 130 not only refers to the actual user who uses the set of RAIDs 130 or the storage system 100, but may also refer to an upper component of the set of RAIDs 130. In other words, the user of the set of RAIDs 130 or the storage system 100 may request an adjustment of a redundant level of one or more RAIDs in the set of RAIDs 130. Also, an upper component of the set of RAIDs 130 may send a request to the processor 110 for adjusting a redundant level of one or more RAIDs in the set of RAIDs 130.

In addition to the explicit request sent by the user, the processor 110 may autonomously trigger an adjustment of a redundant level of one or more RAIDs in the set of RAIDs 130, based on the operation state or the utilization of storage space of the storage system 100. For example, the processor 110 can dynamically adjust a redundant level of one or more RAIDs in the set of RAIDs 130 based on the operation state of the storage system 100. Specifically, the operation state of the storage system 100 may include a workload of the storage system 100 and health status of the plurality of the storage disks 112 to 122. For example, when the workload of the storage system 100 is low (for example, below a threshold), and some storage disks have a high error rate (for example, above a threshold), the processor 110 may select some or all of the set of RAIDs 130 with lower redundant levels to raise their redundant levels. Instead, if the workload of the storage system 100 is high (for example, above a threshold) and all the storage disks have good health status (for example, better than a threshold), the processor 110 may reduce redundant levels of some RAIDs with high workloads in the set of RAIDs 130 to release storage extents.

As another example, the processor 110 may dynamically adjust a redundant level of one or more RAIDs in the set of RAIDs 130 based on the utilization of storage space of the plurality of the storage disks 112 to 122. If the utilization of storage space of some storage disks of the plurality of storage disks 112 to 122 is low (for example, below a threshold), the processor 110 may raise a redundant level of one or more of RAIDs. Since there are many free storage extents in the storage extent pool 115, such a redundant level rise is possible and the utilization of storage space can be enhanced. On the other hand, if the utilization of storage space of the storage disks 112 to 122 is high (for example, above a threshold), the processor 110 may reduce a redundant level of one or more RAIDs in the set of RAIDs 130 to release storage extents.

Accordingly, a cause why a redundant level rise of one or more RAIDs in the set of RAIDs 130 is triggered may be that the user of the set of RAIDs 130 sends a request for raising a redundant level to the processor 110. Another cause of the trigger may be that the processor 110 monitors the operation state and the utilization of storage space or the like of the storage system 100, and detects them satisfying a strategy for raising a redundant level. That is, the processor 110 can determine, based on various states and conditions associated with the storage system 100, that a redundant level of a RAID in the storage system 100 needs to be raised.

However, it should be noted that a redundant level rise of a RAID requires additional system resources in the storage system 100, for example, processing resources (such as CPUs), memory resources, and storage disk space, and so on. Thus, if the load of processing resources or the load of memory resources of the storage system 100 is high (for example, above a threshold) or the storage disk space is less (for example, below a threshold), the processor 110 may prohibit a redundant level rise of a RAID to prevent the performance of the storage system 100 from degrading.

On the other hand, a cause why a redundant level reduction of one or more RAIDs in the set of RAIDs 130 is triggered may be that user of the set of RAIDs 130 send a request for reducing a redundant level to the processor 110. Another cause of the trigger may be that the processor 110 detects that free storage extents in the set of storage extents 115 are about to be exhausted. For example, as the utilization of storage space of the storage system 100 increases, free storage extents become less. In addition, if there are failed storage disks and data reconstruction operations, the free storage extents will also be allocated and occupied. If the number of the free storage extents decreases to a certain degree (for example, a threshold), the processor 110 may trigger an operation of reducing a redundant level of a RAID for the set of storage extents 115.

However, in some embodiments, there are also some restrictions for the operation of reducing a redundant level of a RAID, in order to ensure the reliability of the data stored in the storage system 100. For example, a restriction may be preventing reduction of an initial redundant level of a RAID. When a RAID is created, it has an initial RAID type and an initial redundant level. In order to guarantee the reliability of the data stored in the RAID, the processor 100 can prevent the redundant level of the RAID from being changed to be below its initial redundant level. Also, when the health status of a storage disk deteriorates, for example, the number of I/O errors increases, a redundant level of a RAID on that storage disk is not allowed to be reduced.

At 220, if it is detected that an adjustment of a redundant level for the set of RAIDs 130 is triggered, the processor 110 selects, from the set of RAIDs 130, a target RAID for which the redundant level is to be adjusted. There are various ways to select the target RAID from the set of RAIDs 130 for which the redundant level is to be adjusted. In other words, the selection of the target RAID from the set of RAIDs 130 for which the redundant level is to be adjusted may be based on different rules. For example, in case a redundant level adjustment is indicated by the user of the set of RAIDs 130, the selection of the target RAID may be based on information given by the user. The information can explicitly indicate the target RAID to adjust the redundant level. In this case, the indication sent by the user to perform an adjustment of a redundant level may include an identifier of the target RAID.

In addition, the selection of the target RAID may be based on a redundant level of a RAID in the set of RAIDs 130, the number of RAID extents in a RAID in the set of RAIDs 130, and the like. Specifically, if a redundant level of a RAID in the set of RAIDs 130 is to be raised, the RAID with the lowest redundant level in the set of RAIDs 130 may be selected as the target RAID, since the data stored in that RAID has the highest risk to be unavailable in case a storage disk becomes offline. Also, it is reasonable to select the RAID having the least RAID extents in the set of RAIDs 130 as the target RAID, because a rise of the redundant level of that RAID consumes the least free storage extents, such that the impact on the storage system 100 is minimized.

In contrast, if a redundant level of a RAID in the set of RAIDs 130 is to be reduced, the RAID with the highest redundant level in the set of RAIDs 130 may be selected as the target RAID, since the data stored in that RAID has the lowest risk to be unavailable in case a storage disk becomes offline. Also, it is reasonable to select the RAID having the most RAID extents in the set of RAIDs 130 as the target RAID, because a reduction of the redundant level of that RAID can release the most free storage extents. Hereinafter, for ease of description, it is assumed that the RAID 130-1 is selected as the target RAID for which the redundant level is to be adjusted.

At 230, the processor 110 adjusts the redundant level of the target RAID 130-1 from a first redundant level to a second redundant level. In general, a RAID can be implemented using a RAID type among a plurality of RAID types. Data stored using different RAID types have different redundancy levels and can tolerate different numbers of failed storage extents (or storage disk). In some embodiments, a redundant level of a RAID may represent the tolerance of the RAID for failed storage extents (or storage disks). Thus, different RAID types may have respective redundancy levels, which can be shown in Table 1 as below.

TABLE 1

| Redundant Level | RAID Type |
|---|---|
| 0 | Three-Way Mirror, RAID 6 |
| 1 | Mirror (RAID 1), RAID 5 |
| 2 | RAID 0 |

As shown in Table 1, the type of RAID 6 has a high redundant level 2, the RAID 1 and the RAID 5 have a medium redundant level 1, and the RAID 0 has a low redundant level 0. It will be understood that the specific RAID types and the specific numerical values of the redundant levels shown herein are merely for example and are not intended to limit the scope of embodiments of the present disclosure in any manner. More generally, embodiments of the present disclosure can be equally applicable to any RAID type with any redundant level.

Therefore, in order to adjust the redundant level of the target RAID 130-1 from the first redundant level to the second redundant level, the processor 110 may change the RAID type of the target RAID 130-1 from a RAID type with the first redundant level to another RAID type with the second redundant level. That is, the redundant level of the target RAID 130-1 is adjusted by changing its RAID type. For example, to raise the redundant level of the target RAID 130-1 from the redundant level 1 to the redundant level 2, the processor 110 may change the type of the target RAID 130-1 from the RAID 5 to the RAID 6. Conversely, to reduce the redundant level of the target RAID 130-1 from the redundant level 2 to the redundant level 1, the processor 110 may change the type of target RAID 130-1 from the RAID 6 to the RAID 5.

In various embodiments, the storage system 100 can support conversions among various RAID types, such as, a conversion between the RAID 0 and the RAID 1, a conversion between the RAID 5 and the RAID 6, and the like. In general, a basic conversion operation of a RAID type is to add an additional storage extent for storing parity data into each RAID extent of the RAID, or to remove an additional storage extent for storing parity data from each RAID extent of the RAID. A conversion of RAID type between 4+1 RAID 5 and 4+2 RAID 6 will be described below by way of example with reference to FIG. 3.

Figure 3:
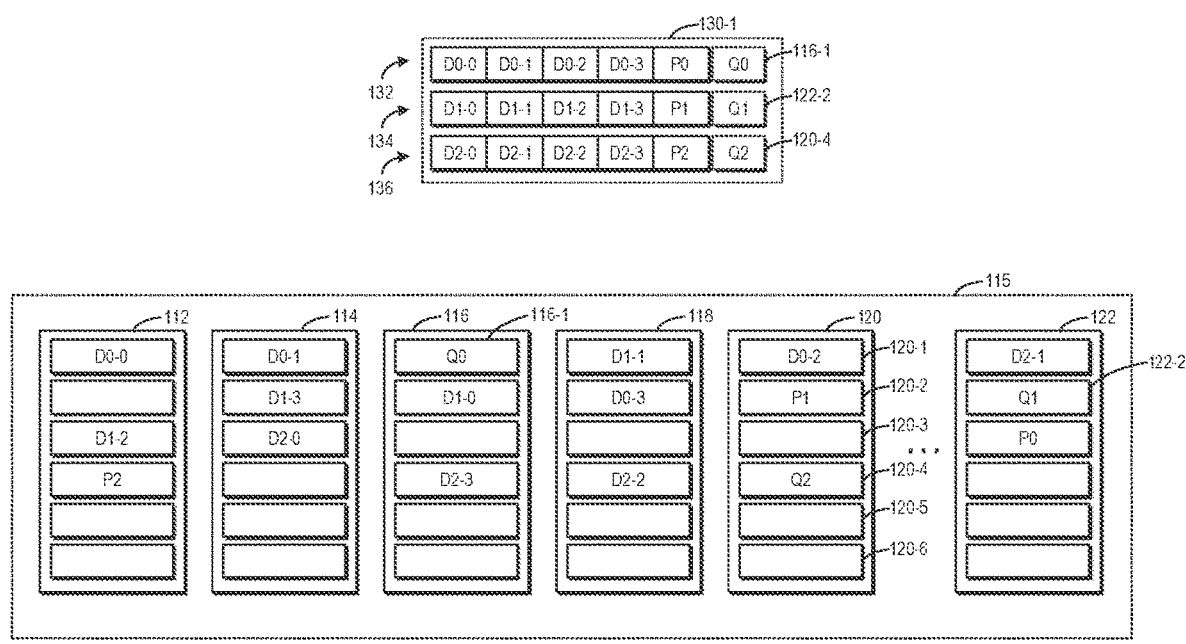
FIG. 3 illustrates a schematic diagram of changing a RAID type in accordance with an embodiment of the present disclosure.

FIG. 3 illustrates a schematic diagram of changing a RAID type in accordance with an embodiment of the present disclosure. In the example of FIG. 3, the RAID 130-1 includes the RAID extent 132, the RAID extent 134, and the RAID extent 136. The RAID extent 132, when its type is the RAID 5, stores data D0-0, data D0-1, data D0-2, data D0-3, and parity data P0 in its five storage extents. These data are respectively stored in storage extents of the storage disks 112, 114, 120, 118, and 122. Similarly, the RAID extent 134, when its type is the RAID 5, stores data D1-0, data D1-1, data D1-2, data D1-3, and parity data P1 in its five storage extents. These data are respectively stored in storage extents of the storage disks 116, 118, 112, 114 and 120. The RAID extent 136, when its type is the RAID 5, stores data D2-0, data D2-1, data D2-2, data D2-3, and parity data P2 in its five extents. These data are respectively stored in storage extents of the storage disk 114, 122, 118, 116, and 112.

In some embodiments, in general, in order to change the RAID type of the target RAID 130-1 from the RAID 5 to the RAID 6, for the RAID extents 132, 134 and 136 in the target RAID 130-1, the processor 110 may add new storage extents 116-1, 122-2, and 120-4 to the RAID extents 132, 134, and 136, respectively. Then, the processor 110 may reconstruct data of the new storage extents 116-1, 122-2, and 120-4 using data of original storage extents in the RAID extents 132, 134, and 136. In this way, it can be ensured that each of the RAID extents 132, 134, and 136 in the target RAID 130-1 can be normally used for storing data after the rise of the redundant level.

More specifically, before the above-mentioned rise of the redundant level, in case the processor 110 determines that the second redundant level to be adjusted to is higher than the current first redundant level, that is, the redundant level of the target RAID 130-1 needs to be raised, the processor 110 can check whether free storage extents in the storage extent pool 115 are sufficient for raising the redundant level of the RAID 130-1 to ensure that the rise of the redundant level can be completed, since the rise of the redundant level of the RAID 130-1 needs to consume free storage extents in the storage extent pool 115. For example, the processor 110 may determine whether a first number of free storage extents in the storage extent pool 115 is greater than a second number of the RAID extents 132, 134, and 136 in the target RAID 130-1 (in this example, the second number is three).

If the first number is greater than the second number, it means that the free storage extents in the storage extent pool 115 are sufficient for raising the redundant level of the target RAID 130-1. Accordingly, the processor 110 can change the RAID type of the target RAID 130-1 from a first type with the first redundant level to a second type with the second redundant level. Conversely, if the free storage extents in the storage extent pool 115 are insufficient for raising the redundant level of the target RAID 130-1, the processor 110 may reselect another RAID in the set of RAIDS 130 as the target RAID. In this way, it can be advantageously ensured that a rise of a redundant level of a RAID can be successfully completed, thereby effectively avoiding wasting resources due to suspension of the raising operation.

If there are enough free storage extents in the storage extent pool 115, the processor 110 may allocate a storage extent for each of the RAID extents 132, 134 and 136 in the target RAID 130-1. It is noted that the allocation of storage extent to the RAID extents 132, 134 and 136 may need to follow a basic rule, namely, extents in each of the RAID extents 132, 134 and 136 have to belong to different storage disks. For example, in the example of FIG. 3, the new storage extent 116-1 of the RAID extent 132 is from the storage disk 116 different from storage disks in which the data D0-0 to D0-3 and P0 are stored, the new storage extent 122-2 of the RAID extent 134 is from the storage disk 122 different from the storage disks in which the data D1-0 to D1-3 and P1 are stored, and the new storage extent 120-4 of the RAID extent 136 is from the storage disk 120 different from the storage disks in which data D2-0 to D2-3 and P2 are stored. After selecting the storage extents 116-1, 122-2 and 120-4 for each of the RAID extents 132, 134 and 136, the state of each of these storage extents 116-1, 122-2 and 120-4 can be changed from free to consumed. Then, the processor 110 can start the type conversion of the target RAID 130-1.

When the type of the RAID 130-1 is converted from the RAID 5 as shown to the RAID 6, the free storage extents 116-1, 122-2 and 120-4 selected from the storage extent pool 150 can be used as storage extents for Q-parity data for the RAID extents 132, 134 and 136. After modifying related metadata of the RAID 130-1 and the storage extent pool 115, the processor 110 can trigger a data reconstruction operation for the converted RAID 130-1 to fill the Q-parity storage extents 116-1, 122-2 and 120-4. After the conversion of all the RAID extents 132, 134, and 136 is completed, the RAID type of the target RAID 130-1 is changed. Thereafter, the target RAID 130-1 can perform I/O operations using the newly added storage extents 116-1, 122-2, and 120-4. It will be understood that although the description herein is made with a conversion between the RAID 5 and the RAID 6, this is merely for example and is not intended to limit embodiments of the present disclosure in any way. More generally, embodiments of the present disclosure can be equally applicable to a conversion between any two RAID types.

In some embodiments, the raising operation of the redundant level on the target RAID 130-1 may be implemented as a background operation of storage system 100. In general, there may be other various background operations in the storage system 100. When a plurality of background operations are simultaneously triggered, the storage system 100 can prioritize the operation with the highest priority in accordance with the priority order of the background operations. Several example background operations that may occur in the storage system 100 are introduced below.

In the storage system 100, when one of the storage disks 112-122 fails, the RAIDs including storage extents in the failed storage disk perform data reconstruction to recover data on the failed storage disk. This operation can be referred to as a data reconstruction operation. If one of the storage disks 112-122 is about to fail, the storage system 100 can copy data in the storage disk to other storage disks. This operation may be called as a pre-active copy (PACO) operation. In addition, if the storage disks 112-122 have different utilization levels of storage space, the storage system 100 may perform a shuffle operation to distribute the consumed storage extents into the storage disks 112-122 evenly, thereby balancing the utilization levels of storage space of the storage disks 112-122.

Each of the data reconstruction operation, the pre-active copy operation, and the shuffle operation needs free storage extents in the storage disks 112-122 to guarantee that the operation can be completed. Hence, the set of storage extents 115 may reserve some free storage extents on each of the storage disks 112-122, so that the above-mentioned operations can use these free storage extents to transfer data. In other words, in addition to the free storage extents in the set of storage extents 115 being occupied for storing user data, these background operations may also consume the free storage extents, and may release the consumed storage extents to be free storage extents again. In general, the data reconstruction operation, the pre-active copy operation, and the shuffle operation are performed based on their priority levels. Among these three operations, the data reconstruction operation has the highest priority, the pre-active copy operation has the second highest priority, and the shuffle operation has the lowest priority.

As mentioned above, the raising operation of the redundant level on one or more RAIDs in the set of RAIDs 130 may be properly performed when the system state of the storage system 100 is healthy and the storage system 100 has sufficient system resources. In addition, performing the data reconstruction operation, the pre-active copy operation, and the shuffle operation may affect these factors. Thus, in some embodiments, the raising operation of the redundant level on a RAID may have the lowest priority among all the background operations. In other words, before or during raising the redundant level of the target RAID 130-1, if the processor 110 detects that another operation consuming the free storage extents in the set of storage extents 115 is triggered, the processor 110 may cease the change of the type of the target RAID 130-1 to the second type.

The processor 110 can then release the storage extents that have been used to change the type of the target RAID 130-1, for use by another operation with a higher priority. In this manner, an operation with a higher priority in the storage system 100 is not affected by a raising operation of a redundant level on a RAID. In addition, in order to reflect the lowest priority of the raising operation of the redundant level, the storage system 100 can set conditions and restrictions for performing the adjustment by means of an adjustment strategy of the redundant level. After a raising operation of a redundant level on a RAID is triggered, the processor 110 may first check if the configured conditions and restrictions are satisfied. If any condition or restriction is not satisfied, the processor 110 may exit the already triggered raising operation of a redundant level.

The above describes an embodiment of a rise of the redundant level of the target RAID 130-1. In other embodiments, the redundant level of the target RAID 130-1 may need to be reduced, that is, the processor 110 may adjust the redundant level of the target RAID 130-1 from a higher first redundant level to a lower second redundant level. In such a case, similar to raising a redundant level, the processor 110 can change the type of the target RAID 130-1 from a first type with the higher first redundant level to a second type with the lower second redundant level. Through the reduction of the redundant level of the target RAID 130-1, the target RAID 130-1 can release free storage extents for use by other operations of the storage system 100.

In some embodiments, in order to change the type of the target RAID 130-1 to the second type with a lower redundant level, in general, the processor 110 may remove the storage extent storing parity data from each of the RAID extents 132, 134 and 136 in the target RAID 130-1. Referring again to FIG. 3, the process is described using an example in which the type of the target RAID 130-1 is converted from the type of RAID 6 to the type of RAID 5. Specifically, in this process, the processor 110 may select storage extents 116-1, 122-2, and 120-4 for the Q parity data from the RAID extents 132, 134, and 136 of the target RAID 130-1. The processor 110 may then modify the metadata of the target RAID 130-1 and the storage extent pool 115 to configure the storage extents 116-1, 122-2, and 120-4 that store Q parity data as free storage extents. Next, the processor 110 can zero these released free storage extents 116-1, 122-2, and 120-4.

In this way, after the redundant level of the target RAID 130-1 is reduced, the data stored in each RAID extent of the target RAID 130-1 will not be lost. After the target RAID 130-1 releases the storage extents, the released storage extents can be zeroed before being allocated for use by other operations to facilitate the use by other operations. It will be understood that although the description herein is made with a conversion between the RAID 6 and the RAID 5, this is merely for example and is not intended to limit embodiments of the present disclosure in any way. More generally, embodiments of the present disclosure may be equally applicable to a conversion between any two RAID types.

As mentioned above, in some embodiments, the raising operation of a redundant level on a RAID may have the lowest priority among all the background operations of the storage system 100. Conversely, in some embodiments, the reducing operation of a redundant level on a RAID may have the highest priority in all the background operations of the storage system 100, because it can release free storage extents for use by other operations. Therefore, the various background operations mentioned herein can be arranged in descending order of priority as follows: the reducing operation of a redundant level, the data reconstruction operation, the pre-active copy operation, the shuffle operation, and the raising operation of a redundant level. Accordingly, when a reducing operation of the redundant level of the target RAID 130-1 is triggered, the processor 110 can directly perform the reducing operation of the redundant level of the target RAID 130-1 without considering other triggered background operations. Furthermore, as mentioned above, a redundant level of a RAID may not be allowed to be reduced below its initial redundant level. That is, the second redundant level to which the target RAID 130-1 is adjusted needs to remain above the initial redundant level of the target RAID 130-1, namely, greater than or equal to the initial redundant level. As such, it can be ensured that the reliability of the user data stored in the target RAID 130-1 is not lower than the initial reliability.

Figure 4:
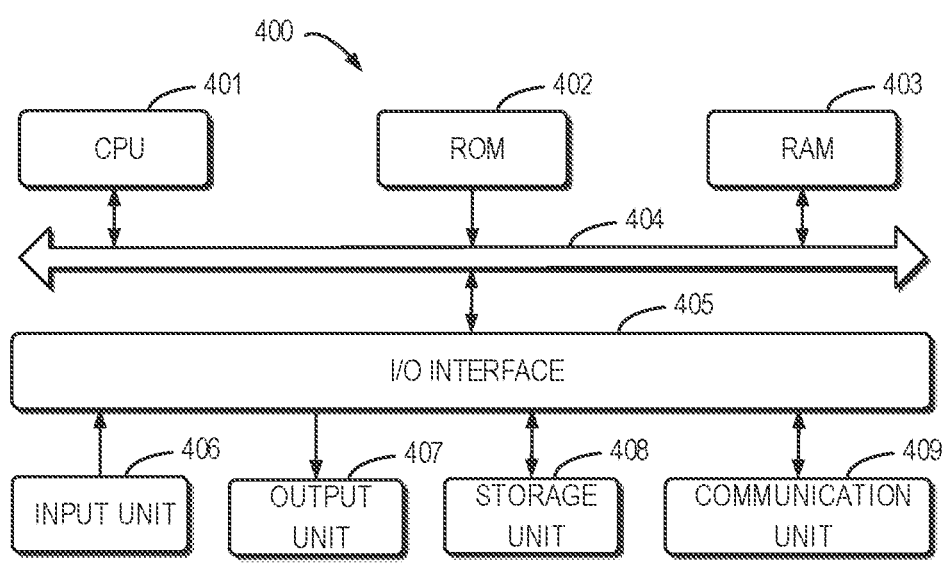
FIG. 4 illustrates a schematic block diagram of a device that can be used to implement embodiments of the present disclosure.

FIG. 4 schematically illustrates a block diagram of a device 400 that can be used to implement embodiments of the present disclosure. As shown in FIG. 4, the device 400 includes a central processing unit (CPU) 401 that may perform various appropriate actions and processing based on computer program instructions stored in a read-only memory (ROM) 402 or computer program instructions loaded from a storage section 408 to a random access memory (RAM) 403. In the RAM 403, various programs and data needed for operations of the device 400 can also be stored. The CPU 401, ROM 402 and RAM 403 are connected to each other via a bus 404. An input/output (I/O) interface 405 is also connected to the bus 404.

The following components in the device 400 are connected to the I/O interface 405: an input 406 such as a keyboard, a mouse and the like; an output unit 407 including various kinds of displays and a loudspeaker, or the like; a memory unit 408 including a magnetic disk, an optical disk, or the like; a communication unit 409 including a network card, a modem, and a wireless communication transceiver, or the like. The communication unit 409 allows the device 400 to exchange information/data with other devices through a computer network such as the Internet and/or various kinds of telecommunications networks.

Various processes and processing described above, for example, the method 200, may be executed by the processing unit 401. For example, in some embodiments, the method 200 may be implemented as a computer software program that is tangibly embodied on a machine readable medium, for example, the storage unit 408. In some embodiments, part or all of the computer programs may be loaded and/or mounted onto the device 400 via ROM 402 and/or communication unit 409. When the computer program is loaded to the RAM 403 and executed by the CPU 401, one or more steps of the method 200 as described above may be executed.

As used herein, the term "includes" and its variants are to be read as open-ended terms that mean "includes, but is not limited to." The term "based on" is to be read as "based at least in part on." The term "one example embodiment" and "an example embodiment" are to be read as "at least one example embodiment." The terms "first," "second," and the like may refer to different or identical objects. Other explicit and implicit definitions may also be included herein.

As used herein, the term "determining" encompasses a wide variety of actions. For example, "determining" can include computing, computing, processing, deriving, investigating, looking up (for example, looking up in a table, database, or another data structure), ascertaining, and the like. Further, "determining" can include receiving (for example, receiving information), accessing (for example, accessing data in memory), and the like. Further, "determining" may include parsing, selecting, selecting, establishing, and the like.

It will be noted that the embodiments of the present disclosure can be implemented in software, hardware, or a combination thereof. The hardware part can be implemented by special logic; the software part can be stored in a memory and executed by a suitable instruction execution system such as a microprocessor or special purpose hardware. Ordinary skilled in the art may understand that the above method and system may be implemented with computer executable instructions and/or in processor-controlled code, for example, such code is provided on a carrier medium such as an optical or electronic signal bearer.

Further, although operations of the present methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, a plurality of steps may be merged into one step, or a step may be divided into a plurality of steps for execution. In practice, according to the embodiments of the present invention, the features and functions of two or more units described above may be embodied in one unit. In turn, the features and functions of one unit described above may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the example embodiments disclosed herein.

We claim:

1. A method for storage management, comprising:
   detecting a trigger for an adjustment of a redundant level for a set of redundant array of independent disks (RAIDs), each of the set of RAIDs comprising one or more RAID extents, each RAID extent being formed by a plurality of storage extents from a set of storage extents, the set of storage extents being obtained by dividing a plurality of storage disks into storage extents, the plurality of storage extents being located in different storage disks of the plurality of storage disks, wherein detecting the trigger for the adjustment of the redundant level for the set of RAIDs includes a processor autonomously detecting both that at least one of the plurality of the storage disks has an error rate above a first threshold and that a workload of a storage system that includes both the processor and the plurality of storage disks has reached a second threshold;
   in response to detecting the trigger, selecting, from the set of RAIDs, a target RAID for which the redundant level is to be adjusted; and
   adjusting the redundant level of the target RAID from a first redundant level to a second redundant level.

2. The method of claim 1, wherein adjusting the redundant level of the target RAID from the first redundant level to the second redundant level comprises:
   in response to the second redundant level being higher than the first redundant level,
   determining whether a first number of free storage extents in the set of storage extents is greater than a second number of RAID extents in the target RAID; and
   in response to the first number being greater than the second number, changing a type of the target RAID from a first type with the first redundant level to a second type with the second redundant level.

3. The method of claim 2, wherein changing the type of the target RAID to the second type comprises:
   for each RAID extent in the target RAID,
   adding a new storage extent into the RAID extent; and
   reconstructing data in the new storage extent using data in original storage extents in the RAID extent.

4. The method of claim 2, further comprising:
   in response to detecting a trigger for a further operation consuming the free storage extents, ceasing the change of the type of the target RAID to the second type; and
   releasing storage extents used for performing the change.

5. The method of claim 1, wherein adjusting the redundant level of the target RAID from the first redundant level to the second redundant level comprises:
   in response to the second redundant level being lower than the first redundant level, changing a type of the target RAID from a first type with the first redundant level to a second type with the second redundant level.

6. The method of claim 5, wherein changing the type of the target RAID to the second type comprises:
   removing a storage extent storing parity data from each RAID extent of the target RAID.

7. The method of claim 5, wherein the second redundant level is above an initial redundant level of the target RAID.

8. The method of claim 1, wherein the target RAID is selected based on at least one of:
   information indicating that the redundant level of the target RAID is to be adjusted,
   a redundant level of a RAID of the set of RAIDs, and
   a number of RAID extents in a RAID of the set of RAIDs.

9. The method of claim 1, wherein detecting the trigger for the adjustment of the redundant level of the set of RAIDs comprises:
   receiving an indication for performing the adjustment of the redundant level from a user of the set of RAIDs.

10. The method of claim 1, wherein detecting the trigger for the adjustment of the redundant level of the set of RAIDs further comprises:
    determining that storage space utilization of the plurality of storage disks has reached a third threshold.

11. The method of claim 1, wherein autonomously detecting that the workload of the storage system that includes both the processor and the plurality of storage disks has reached the third threshold comprises detecting that the workload of the storage system that includes both the processor and the plurality of storage disks is below the third threshold.

12. The method of claim 11, wherein selecting the target RAID for which the redundant level is to be adjusted comprises selecting at least one of the RAIDs having a lower redundant level; and
wherein adjusting the redundant level of the target RAID from the first redundant level to the second redundant level comprises adjusting the first redundant level to a second redundant level that is higher than the lower redundant level.

13. An electronic device, comprising:
at least one processor; and
at least one memory storing computer program instructions, the at least one memory and the computer program instructions being configured, with the at least one processor, to cause the electronic device to:
detect a trigger for an adjustment of a redundant level for a set of redundant array of independent disks (RAIDs), each of the set of RAIDs comprising one or more RAID extents, each RAID extent being formed by a plurality of storage extents from a set of storage extents, the set of storage extents being obtained by dividing a plurality of storage disks into storage extents, the plurality of storage extents being located in different storage disks of the plurality of storage disks, wherein the trigger for the adjustment of the redundant level for the set of RAIDs is detected by the processor autonomously detecting both that at least one of the plurality of the storage disks has an error rate above a first threshold and that a workload of a storage system that includes both the processor and the plurality of storage disks has reached a second threshold;
in response to detecting the trigger, select, from the set of RAIDs, a target RAID for which the redundant level is to be adjusted; and
adjust the redundant level of the target RAID from a first redundant level to a second redundant level.

14. The electronic device of claim 13, wherein the at least one memory and the computer program instructions are further configured, with the at least one processor, to cause the electronic device to:
in response to the second redundant level being higher than the first redundant level,
determine whether a first number of free storage extents in the set of storage extents is greater than a second number of RAID extents in the target RAID; and
in response to the first number being greater than the second number, change a type of the target RAID from a first type with the first redundant level to a second type with the second redundant level.

15. The electronic device of claim 14, wherein the at least one memory and the computer program instructions are further configured, with the at least one processor, to cause the electronic device to:
for each RAID extent in the target RAID,
add a new storage extent into the RAID extent; and
reconstruct data in the new storage extent using data in original storage extents in the RAID extent.

16. The electronic device of claim 14, wherein the at least one memory and the computer program instructions are further configured, with the at least one processor, to cause the electronic device to:
in response to detecting a trigger for a further operation consuming the free storage extents, cease the change of the type of the target RAID to the second type; and
release storage extents used for performing the change.

17. The electronic device of claim 13, wherein the at least one memory and the computer program instructions are further configured, with the at least one processor, to cause the electronic device to:
in response to the second redundant level being lower than the first redundant level, change a type of the target RAID from a first type with the first redundant level to a second type with the second redundant level.

18. The electronic device of claim 17, wherein the at least one memory and the computer program instructions are further configured, with the at least one processor, to cause the electronic device to:
remove a storage extent storing parity data from each RAID extent of the target RAID.

19. The electronic device of claim 17, wherein the second redundant level is above an initial redundant level of the target RAID.

20. The electronic device of claim 13, wherein the target RAID is selected based on at least one of:
information indicating that the redundant level of the target RAID is to be adjusted,
a redundant level of a RAID of the set of RAIDs, and
a number of RAID extents in a RAID of the set of RAIDs.

21. The electronic device of claim 13, wherein the at least one memory and the computer program instructions are further configured, with the at least one processor, to cause the electronic device to:
receive an indication for performing the adjustment of the redundant level from a user of the set of RAIDs.

22. The electronic device of claim 13, wherein the at least one memory and the computer program instructions are further configured, with the at least one processor, to cause the electronic device to:
determine that storage space utilization of the plurality of storage disks has reached a third threshold.

23. A computer program product having a non-transitory computer readable medium which stores a set of instructions to perform storage management; the set of instructions, when carried out by computerized circuitry, causing the computerized circuitry to perform a method of:
detecting a trigger for an adjustment of a redundant level for a set of redundant array of independent disks (RAIDs), each of the set of RAIDs comprising one or more RAID extents, each RAID extent being formed by a plurality of storage extents from a set of storage extents, the set of storage extents being obtained by dividing a plurality of storage disks into storage extents, the plurality of storage extents being located in different storage disks of the plurality of storage disks, wherein detecting the trigger for the adjustment of the redundant level for the set of RAIDs includes a processor autonomously detecting both that at least one of the plurality of the storage disks has an error rate above a first threshold and that a workload of a storage system that includes both the processor and the plurality of storage disks has reached a second threshold;
in response to detecting the trigger, selecting, from the set of RAIDs, a target RAID for which the redundant level is to be adjusted; and adjusting the redundant level of the target RAID from a first redundant level to a second redundant level.

* * * * *